(12) United States Patent
Duroux et al.

(10) Patent No.: US 7,360,908 B1
(45) Date of Patent: Apr. 22, 2008

(54) EXTERIOR MIRROR FOR MOTOR VEHICLE

(75) Inventors: Bernard Duroux, Garancieres (FR); Daniel Dumont, Veneux les Sablons (FR)

(73) Assignee: Visiocorp Patents S.a.r.l. (LU)

( * ) Notice: Subject to any disclaimer, the term of this patent is extended or adjusted under 35 U.S.C. 154(b) by 883 days.

(21) Appl. No.: 09/602,923

(22) Filed: Jun. 23, 2000

(51) Int. Cl.
*G02B 5/08* (2006.01)
*G02B 7/182* (2006.01)
*B60R 1/06* (2006.01)

(52) U.S. Cl. .................. 359/841; 359/843; 359/877
(58) Field of Classification Search .............. 359/841, 359/843, 872, 877
See application file for complete search history.

(56) References Cited

U.S. PATENT DOCUMENTS

| | | | | |
|---|---|---|---|---|
| 3,612,647 | A * | 10/1971 | LaPrairie | |
| 4,295,708 | A * | 10/1981 | Albrecht et al. | |
| 4,679,158 | A * | 7/1987 | Tate | |
| 4,786,156 | A * | 11/1988 | Kotani et al. | |
| 4,936,671 | A * | 6/1990 | Kaspar | |
| 4,981,349 | A * | 1/1991 | Tamiya et al. | 359/877 |
| 5,012,693 | A * | 5/1991 | Enomoto et al. | |
| 5,033,835 | A * | 7/1991 | Platzer, Jr. | 359/877 |
| 5,050,977 | A * | 9/1991 | Platzer, Jr. | 359/866 |
| 5,080,492 | A * | 1/1992 | Platzer, Jr. | 359/877 |
| 5,233,228 | A * | 8/1993 | Krieg | |
| 5,514,940 | A * | 5/1996 | Okamoto | |
| 5,541,778 | A * | 7/1996 | DeFlorio | |
| 5,640,056 | A * | 6/1997 | Setzer et al. | |
| 5,719,713 | A * | 2/1998 | Brown | |
| 5,835,291 | A * | 11/1998 | Takayama | |
| 5,886,838 | A * | 3/1999 | Kuramoto | |
| 5,914,824 | A * | 6/1999 | Valentino | |
| 5,953,167 | A * | 9/1999 | Valentino | |
| 6,116,743 | A * | 9/2000 | Hoek | |
| 6,204,753 | B1 * | 3/2001 | Schenk et al. | |
| 6,315,420 | B1 * | 11/2001 | Standen et al. | |

FOREIGN PATENT DOCUMENTS

| | | |
|---|---|---|
| EP | 0209296 B1 | 9/1989 |
| EP | 0838371 A1 | 4/1998 |
| EP | 0881124 A2 | 12/1998 |
| GB | 2156545 A | 10/1985 |
| GB | 2326860 A | 1/1999 |
| JP | 55-39808 | * 3/1980 |
| JP | 3-16840 | * 1/1991 |
| JP | 3-16841 | * 1/1991 |
| JP | 03-016841 | * 1/1991 |
| JP | 03-224838 | * 10/1991 |
| JP | 826030 | 1/1996 |

* cited by examiner

*Primary Examiner*—Ricky D. Shafer

(57) ABSTRACT

An exterior rear view mirror for a vehicle has a housing pivotally mounted on a base for angular movement about a first pivot axis and an electric motor for causing such movement. A controller operates the motor at either of two different speeds. The controller includes a counter for counting the number of revolutions of the output shaft of the motor so as to determining the angle through which the housing has been moved, thus enabling the housing to be restored to its original position by causing the motor to perform the same number of revolutions in the opposite direction.

4 Claims, 2 Drawing Sheets

EXTERIOR MIRROR FOR MOTOR VEHICLE

FIELD

This invention relates to an exterior rear view mirror for a vehicle.

RELATED ART

EP-A-0209296 discloses an exterior mirror for a vehicle having a mirror comprising a base member for mounting on a vehicle body, a housing pivotally mounted on the base for angular movement about a first pivot axis, a reflective member pivotally mounted in the housing for angular movement relative thereto only about a second pivot axis and electrically operated drive means for causing angular movement of the housing about first pivot axis and angular movement of the reflective member relative to the housing about the second pivot axis.

EP-A-0881124 discloses an exterior mirror for a vehicle having a mirror head which can be moved from a deployed position for normal driving to a parked position in which it lies closely adjacent to the vehicle body and thus is less liable to damage when the vehicle is not in use.

SUMMARY OF THE INVENTION

It is an object of the present invention to provide an exterior vehicle mirror in which the same mechanism is used both to adjust the orientation of the mirror head about a first axis, in order to provide the driver with a required field of view, and to move the mirror head between a deployed position and a parked position.

According to the invention, an exterior rear view mirror for a vehicle comprises a base for mounting on a vehicle body, a housing pivotally mounted on the base for angular movement about a first pivot axis, a reflective member mounted in the housing, an electric motor having an output shaft arrange to cause angular movement of the housing about the first pivot axis, and a controller adapted to control the electric motor so as to selectively drive the housing about the first axis either at a first speed or at a second speed which is faster than the first speed.

DETAILED DESCRIPTION OF THE PREFERRED EMBODIMENT

Figure 2:
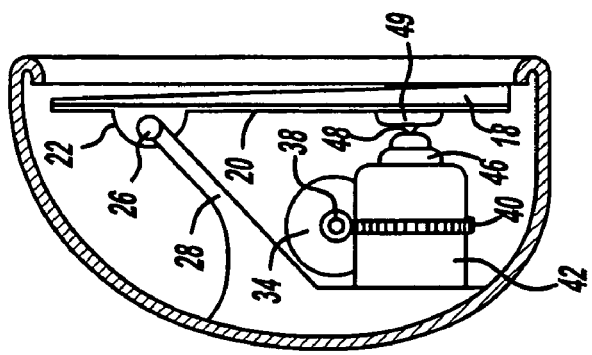
FIG. 2 is a cross-sectional view taken on the line 2-2 in FIG. 1.
Figure 1:
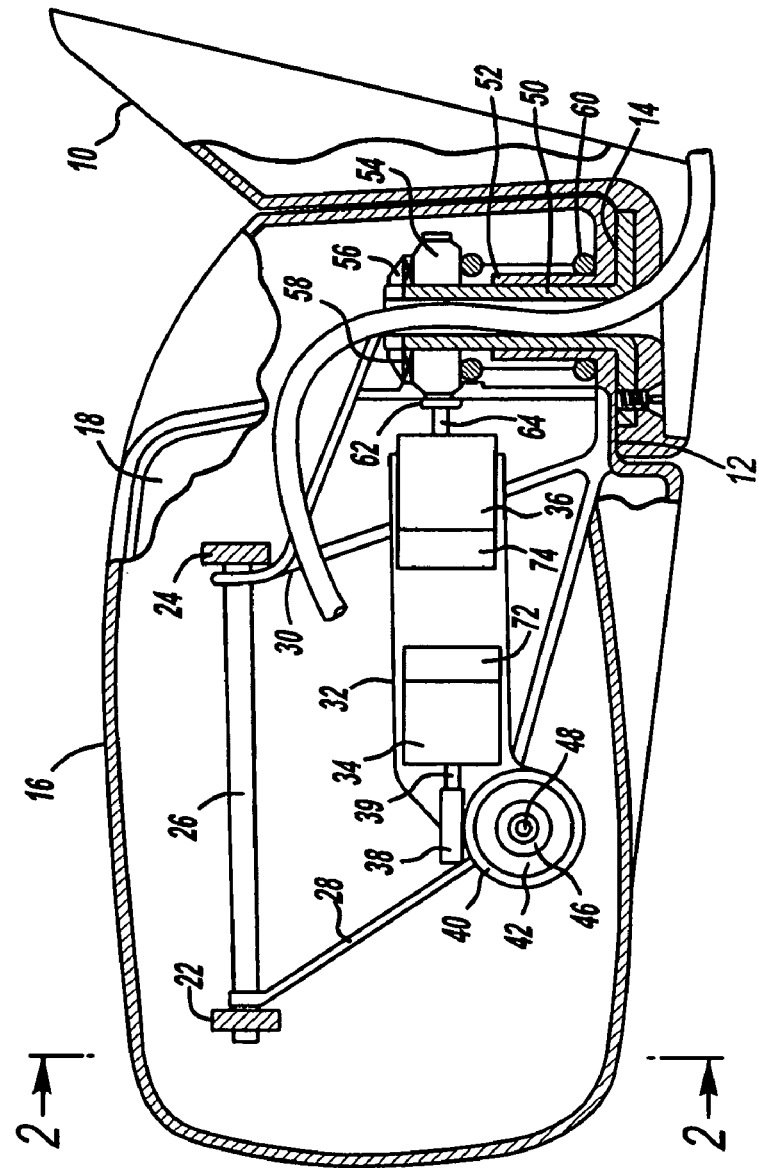
FIG. 1 is a partially broken-away elevational view of a rear view mirror in accordance with the invention from the side of the housing on which the reflective member is exposed.

FIGS. 1 and 2 illustrate a rear-view mirror having a base member 10 adapted to be mounted on the body of a vehicle. The base member 10 has a flat upper wall 12 which abuts against a flat lower wall of a mirror housing 16.

Within the housing 16, a reflective member 18 is secured to a mirror carrier 20 with integrally formed rearwardly extending brackets 22 and 24 which are journalled on a shaft 26. The shaft 26 is mounted on ribs 28 and 30 which are formed integrally with the housing 16. As can be seen from FIG. 2, the reflective member 18 comprises a prism oriented so that its upper edge is wider than its lower edge, the angle between its two faces preferably being between 1° and 3°. The prism 18 has a reflective layer on its surface abutting the mirror carrier 20. At night, if the driver of a following car fails to dip his headlights, the mirror carrier 20 can be tilted through the angle between the faces of the prism (i.e. between 1° and 3°) so that a driver of the vehicle sees an image reflected from the front surface of the prism 18 which is dimmer than the image which would have been reflected by the reflective layer.

A mounting member 32 extends between the ribs 28 and 30 and has two electric motors 34 and 36 mounted thereon. A worm gear 38 is mounted on the output shaft 39 of the motor 34. The worm gear 38 engages with a pinion 40 forming part of a screw jack drive 42 of the type described in EP-A-0549173. A jacking screw 44 projects through a flexible synthetic rubber boot 46 on one end of the screw jack drive 42. A spherical formation 48 on the end of the jacking screw 44 engages in a complementary socket 49 on the inside surface of the mirror carrier 20. Thus, rotation of the worm gear 38 causes adjustment of the orientation of the reflective member 18 about the shaft 26.

The base member 10 has a flanged hollow spigot 50 secured by its flange to the flat upper wall 12 so as to project through an opening in the flat lower wall 14 of the housing 16. A cylindrical wall 52, formed integrally with the housing 16, surrounds the spigot 50 so as to form a pivot bearing. A pinion 54 is journalled on the spigot 50 above the cylindrical wall 52. The upper face of the pinion 54 carries detent formations 56 which are adapted to engage with complementary formations on a cap 58 which is rotationally fast with the spigot 50. A compression spring 60 urges the detent formations 56 and the cap 58 into engagement with one another. The pinion 54 is engaged by a worm gear 62 secured to the output shaft 64 of the second motor 36. Thus, rotation of the shaft 64 causes angular movement of the housing 16 relative to the base member 10.

If the housing 16 is subject to impact from the front or rear, the detent formations 56 disengage from the complementary formations on the cap 58, allowing the housing 16 to fold backwards or forwards against the side of a vehicle on which the mirror is mounted.

Figure 3:
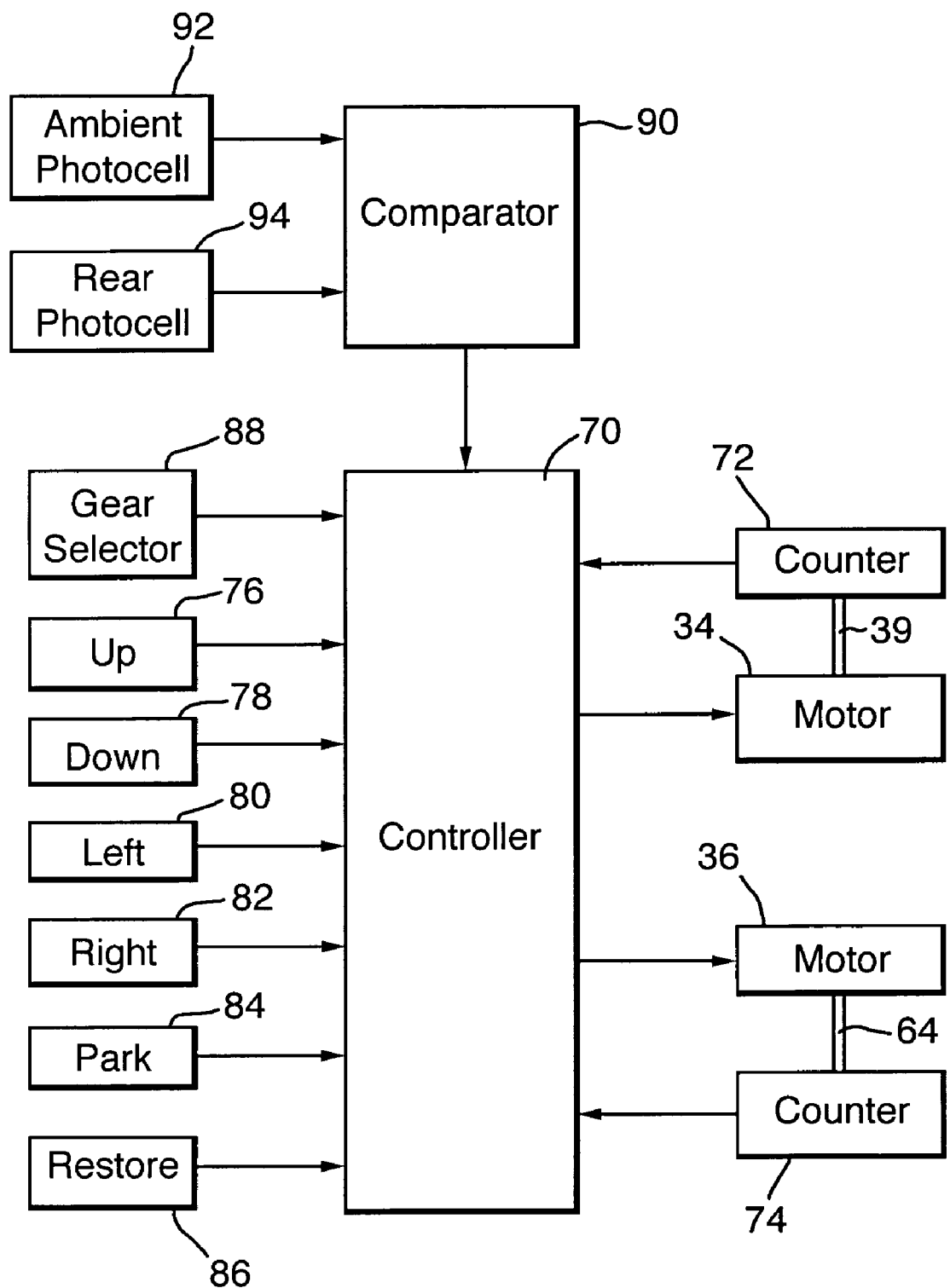
FIG. 3 is a block diagram illustrating the control system for the mirror shown in FIGS. 1 and 2.

FIG. 3 is a block diagram of a control system for the motors 34 and 36. The control system comprises a controller 70 which produces control signals to operate the motors 34 and 36, each of which has associated therewith a respective counter 72, 74 for supplying a signal to the controller 70 indicating the number of revolutions made by the corresponding motor 34, 36.

In order to adjust the mirror in the up/down direction, the controller 70 has an "Up" push button 76 and a "Down" push button 78. The motor 34 rotates in the appropriate direction for as long as either of these push buttons is depressed so as to tilt the mirror carrier 20 at a rate of about 3° per second. Similarly, the controller 70 has "Left" and "Right" push buttons 80 and 82 for causing the controller to send appropriate signals to the motor 36 to cause angular movement of the housing 16 about the spigot 50, once again at a rate of about 3° per second. This permits the orientation of the mirror carrier to be adjusted to provide the required field of view depending on the driver's seating position in the vehicle.

When it is desired to drive the mirror housing 16 to a parked position in which it is folded against the side of the vehicle, a "Park" button 84 on the controller is pressed. This causes the controller to drive the motor 36 at a speed such as to cause angular movement of the housing 16 about the spigot 50 at a rate of about 30° per second. At the same time, the controller counts the output produced by the counter 74 to determine the number of revolutions performed by the motor 36 to move the housing 16 until it abuts against a stop (not shown), thus causing the motor 36 to stall. The resulting rise in current is sensed by the controller which then disconnects the supply to the motor 36.

When it is desired to restore the mirror from its parked position to its deployed position, a "Restore" push button 86 on the controller 70 is pressed. The controller then supplies electric current to the motor 36, so as to cause it to rotate in the opposite direction until the counter 74 indicates that the same number of revolutions have been performed as was necessary to move the mirror head 16 from its deployed position to its parked position.

The controller 70 also receives an input from the gear selector 88 of the vehicle, indicating the engagement of reverse gear. This causes the controller 70 to supply current to the motor 34 to cause it to tilt the mirror carrier downwardly at a rate of about 30° per second until it abuts against a stop (not shown) located so that the field of view of the mirror includes the ground adjacent to the corresponding rear wheel of the vehicle. The counter 72 provides a signal to the controller 70 indicating the number of revolutions of the motor 34 necessary to perform this tilting movement. When the mirror carrier reaches this stop, the motor 34 stalls and the resulting increase in current is detected by the controller 70 which then disconnects the electrical supply to the motor 34. When reverse gear is disengaged, the controller 70 causes the motor 34 to rotate in the opposite direction until the counter 72 indicates that the same number of revolutions have been performed as were necessary to move the mirror to its tilted position.

A comparator 90 is arranged to receive a signal from an ambient photocell 92 indicating the level of ambient light outside the vehicle. The comparator 90 also receives a signal from a rear photocell 94 indicating the level of light incident on the mirror from the rear of the vehicle. When the level of light indicated by the ambient photocell 92 indicates lack of daylight and the rear photocell 94 indicates a light level which exceeds that detected by the ambient photocell 92 by more than a predetermined amount e.g. because the driver of a following vehicle has failed to dip his headlights, the comparator 90 sends a signal to the controller 70, causing the motor 34 to tilt the mirror carrier 20 downwardly until the counter 72 indicates that the number of revolutions performed is sufficient to tilt the mirror carrier 20 through an angle equal to the angle between the front and rear surfaces of the prism 18. The driver now sees a dimmer image reflected from the front surface of the prism 18 rather than a bright image reflected from the reflective layer on the rear surface thereof. To avoid repeated rapid movement of the mirror between its tilted position and its normal position, the controller 70 causes the motor 34 to tilt the mirror carrier 20 back to its normal deployed position only when the difference in light levels between the two photocells 92 and 94 has been less than the above mentioned threshold for at least ten seconds. When this occurs, the motor 34 is run until the counter 72 indicates that the number of revolutions equivalent to the prism angle have been performed.

The controller 70 may include a memory adapted to store information identifying one or more desired deployed positions for the reflective member 18.

The invention claimed is:

1. An exterior rear view mirror for a vehicle comprising:
   a base for mounting on a vehicle body;
   a housing pivotally mounted on said base for angular movement about a first pivot axis;
   at least one rib integrally formed within the interior of said housing;
   a carrier contained within said housing and pivotally mounted to said at least one rib for pivoting about a second axis;
   a reflective member mounted on said carrier;
   a mounting member connected to said at least one rib and contained within said housing;
   an electric motor mounted on said mounting member, said electric motor having an output shaft selectively operable to cause angular movement of said housing about said first pivot axis at a first discrete speed and at a second discrete speed;
   a controller adapted to control the electric motor to selectively drive said housing about said first pivot axis either at said first discrete speed or at said second discrete speed which is faster than said first discrete speed; and
   wherein said exterior mirror further includes a counter for counting the number of revolutions of said electric motor.

2. The exterior mirror of claim 1, wherein said carrier further includes at least one bracket journalled on a shaft, said shaft being mounted on said at least one rib, and forming said second pivot axis.

3. The exterior mirror of claim 1, wherein when said housing is moved from a deployed position to a parked position, the controller will command the electric motor to rotate the housing about the first pivot axis positioning said housing in a folded position adjacent the side of the vehicle against a stop, and the counter will count the number of revolutions performed by the motor.

4. The exterior rear view mirror of claim 3, wherein when the housing is to be returned to the deployed position from the parked position, the controller will command the electric motor to rotate the housing about the first pivot axis from the parked position to the deployed position, and the controller will command the electric motor to rotate the same number of revolutions compared to when the housing was moved from the deployed position to the parked position, thereby moving the housing to the deployed position.

* * * * *